Jan. 6, 1959 J. A. MOWAT 2,867,254
EGG SEPARATOR

Filed Aug. 12, 1957 2 Sheets-Sheet 1

INVENTOR
JAMES MOWAT
By:
Fetherstonhaugh & Kent
HIS ATTYS.

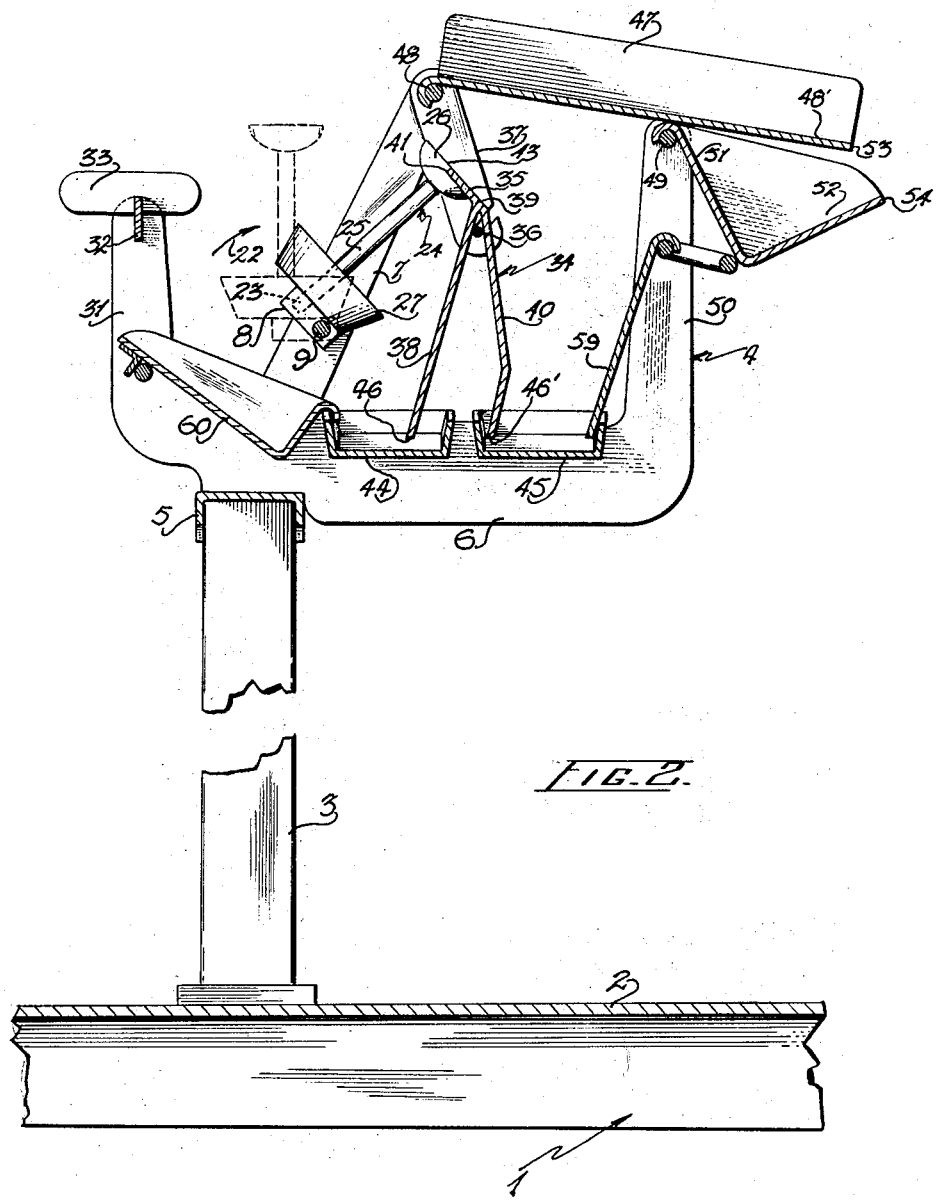

United States Patent Office 2,867,254
Patented Jan. 6, 1959

2,867,254
EGG SEPARATOR

James A. Mowat, Winnipeg, Manitoba, Canada, assignor to Mid-West Produce Co., Ltd., Winnipeg, Manitoba, Canada Application August 12, 1957, Serial No. 677,563

4 Claims. (Cl. 146—2)

My invention relates to new and useful improvements in egg separators, particularly in egg separators normally used for the commercial separation of the albumen from the yolks of eggs.

Heretofore, many egg separators have been designed all of which suffer from such disadvantages as inefficient or incomplete separation of the yolk from the albumen, inability to prevent a spoiled egg from passing into the separated components and difficulty of cleaning and maintaining sterile the apparatus used.

By providing egg separating components including yolk receiving cups and albumen receiving cups therebelow mounted upon a tilting bar, the eggs are enabled to be broken into the yolk receiving cups the size of which is just sufficient to hold a yolk thereby enabling the albumen to spill downwardly over the outer surfaces of the yolk receiving cup into the albumen receiving cup therebelow. Furthermore, when the cups are dumped by the tilting of a support bar, the albumen adhering to the yolk over the sides of the yolk receiving cups are cut off at the same time as the contents are dumped into separate troughs from which the components may be collected. By providing a plurality of such egg separating components, if one egg is found to be tainted, the entire cup assembly can be removed before contamination of the collected components takes place.

Therefore, the principal object of my invention is to provide a device of the character herewithin described in which a plurality of eggs may be separated simultaneously, the separated components checked, and then these components decanted into separate troughs for collection.

Another object of my invention is to provide a device of the character herewithin described in which the albumen adhering to the egg shells after deposition has taken place, may be drained therefrom and collected separately thus adding to the percentage recovery of the component parts of the eggs.

A further object of my invention is to provide a device of the character herewithin described in which the operator can use both hands to crack and deposit eggs into the separating components and can then operate the support bar by knee or foot action to decant same into the troughs thus leading to a more efficient and speedier operation.

Yet another object of my invention is to provide a device of the character herewithin described in which the egg separating components are readily removed from the support bar, are readily separated for cleaning and sterilizing processes and which furthermore, provide a far more efficient separation of the egg yolks from the albumen surrounding same.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 2 is a section substantially along the lines 2—2 of Figure 1.

In the drawings like characters of reference indicate corresponding parts in the different figures.

Figure 1:
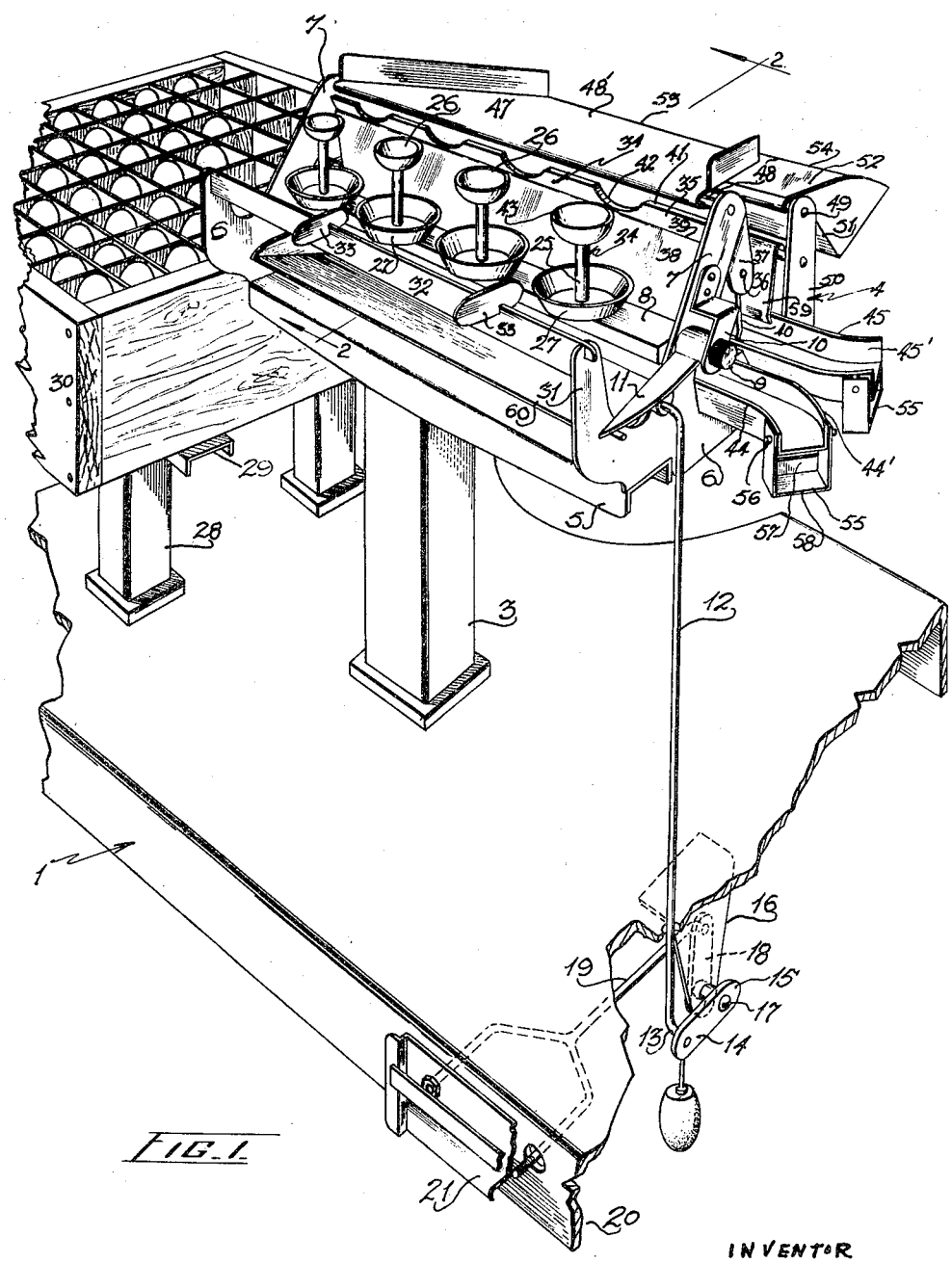
Figure 1 is a fragmentary perspective view of my device.

The device hereinafter to be described, is preferably, but does not necessarily have to be manufactured from stainless steel in order to facilitate the maintenance of a clean and sterile assembly and in the subsequent explanation, the egg yolk is described as being separated from the albumen or egg white normally surrounding same and in this connection the term "albumen" or "egg white" includes all of the relatively colorless material surrounding the yellow or yolk portion of the egg with the exception of the membrane immediately within the shell which is, of course, retained in the shell when same is cracked open.

Proceeding now to describe my invention in detail, it will be seen upon reference to the accompanying drawings that I have provided a supporting framework collectively designated 1 consisting of a base panel or plate 2 and having a standard 3 extending upwardly therefrom, upon which my egg separator collectively designated 4, is mounted.

The egg separator consists of a transverse crossbar 5 to which are secured combination side plates 6, said side plates carrying the main components as will hereinafter be described.

The side plates include flanges 7 inclining upwardly and rearwardly therefrom, and a support 8 extends between these flanges, being mounted for tilting movement therebetween by means of bearing pins 9.

The right-hand pin 9 with reference to Figure 1, is extended outwardly and is supported further by means of offstanding bracket 10 and between the bracket and flange 7, a lever 11 is secured to the extended end of the pin 9. A rod 12 is pivotally secured by its upper end thereof to the lever 11 and extends downwardly through the base panel 2 to be connected by the lower end 13 thereof to a weighted lever 14. This weighted lever is supported by the rear end 15 thereof within a depending bracket 16, by means of pin 17 and upon the inner end of pin 17 a further lever 18 is secured. To the upper end of lever 18 is pivotally secured a control rod 19 which extends through the skirt 20 of the base panel 2 and terminates in a knee operated plate 21.

In operation, inward movement of this knee operated plate 21, tilts the support or bar 8 in the direction of arrow 22 (see Figure 2), the purpose of which will be hereinafter described.

The support or bar 8 is provided with a plurality of drillings 23 within the upper surface thereof and egg separating components collectively designated 24 are mounted within these apertures on the support 8 for tilting action therewith.

In the present embodiments, four such egg separators 24 are shown, each of which includes a rod or standard 25 insertable within the apertures 23 and surmounted by a yolk containing cup 26 upon the upper end thereof. The lower ends of these rods 25 pass through the centre of an albumen or egg whites collecting cup 27 so that the cups 26 and the cups 27 are concentrically mounted although spaced apart one from the other. Furthermore, it will be appreciated that the yolk containing cups 26 are considerably smaller than the albumen containing cup 27 and in fact the yolk containing cups 26 are of a size to just hold the yolk of a conventional egg.

To one side of the egg separator collectively designated 4, I provide a pair of standards 28 together with cross bars 29 upon which a conventional egg crate 30 may be supported for the convenience of the operator.

Furthermore, spanning the front flanges 31 of the side plates 6 is a cross-bar 32 having a pair of transverse egg cracking plates 33 mounted thereon upon the edges of which the eggs may be cracked prior to depositing same in the egg separators 24.

In operation up to this point, the eggs are cracked upon the plates 33 and the entire contents of the egg is dumped into the yolk receiving cup 26 of one of the egg separator components 24. As this cup 26 will just hold the yolk, it will be obvious that the albumen or whites will overflow around the sides of this cup and be deposited within the whites containing cup 27.

However, it will be apparent that a considerable amount of the albumen will hang down the outside of the cups 26 due to its adherence to the yolk by the conventional membrane and it is necessary to separate or detach this portion of the albumen from the yolk prior to dumping or decanting the component parts.

I have, therefore, provided an albumen cut-off plate collectively designated 34 which consists of a forwardly inclined plate 35 spanning the side plates 6 and depending upon a rod 36 spanning depending flanges 37 which in turn extend rearwardly and downwardly from the upper ends of the inclined flanges 7. A forwardly and downwardly inclined guide plate 38 extends downwardly from the lower edge 39 of the cut-off plate and a rearwardly and downwardly extending guide plate 40 extends downwardly also from the lower edge 39 of the cut-off plate, the purpose of which is to guide the yolk and albumen components into designated collecting means as will hereinafter be described. Upon the upper or forward edge 41 of the cut-off plate 35, I provide semi-circular cut-outs 42 adjacent each egg separating component 24, each of these cut-outs 42 being designed to contact around the perimeters 43 of the yolk receiving cups 26 when the aforementioned support 8 is tilted in the direction of arrow 22 as hereinbefore described, by the knee operation of plate 21. The contacting of these semi-circular cut-outs around the perimeters 43 effects the necessary separation of the albumen hanging down the outsides of the cups 26 and enables same to slide down the surface of the guide plates 38. At the same time, of course, the contents of the whites receiving cups 27 are also dumped during this tilting action as shown in Figure 2 and the yolks within the yolk receiving cups 26 are dumped over the back of the cut-off plate 35 and upon the rear surface of the rearward guide plate 40.

Spanning the aforementioned side plates 6 is a pair of troughs 44 and 45, trough 44 receiving the aforementioned egg whites or albumen component and the rear trough 45 receiving the egg yolk. In this connection, the lower ends 46 and 46' of the guide plates 38 and 40 respectively, terminate within the troughs 44 and 45 respectively as shown in Figure 2.

After the eggs have been cracked and dumped within the separating component 24 and while the egg components are being tilted to decant the components into the corresponding troughs, the egg shells which contain residual amounts of albumen, are placed upon a rearwardly inclining drain tray 47 spanning the side plates 6 and being mounted upon a rod 48 spanning the upper ends of the inclined flanges 7 thereof as clearly illustrated in Figures 1 and 2. The rear end 48' of the drain tray 47 rests upon a further rod 49 spanning the rear flanges 50 of the side plates 6, said rod also supporting the front end 51 of a further albumen collecting trough 52. This trough is V-shaped when viewed in cross-section and the rear edge 53 of the drain tray overlaps this trough, but it should be appreciated that the gap between the rear edge 53 and the rear edge 54 of the trough 52, although sufficient to allow the albumen draining from the tray 47, to enter the trough 52, is not wide enough to allow the egg shells to enter therein. These egg shells, after draining, are pushed rearwardly manually into an egg shell receiving container (not illustrated) for further disposal.

The aforementioned troughs 44 and 45 terminate in forwardly and rearwardly open right-hand curved ends 44' and 45' respectively and beneath these ends it is desirable to place removable containers (not illustrated) within which the component parts of the eggs are collected.

However, when it is necessary to empty these containers, it is obviously necessary to shut off these open ends 44' and 45' respectively in order to prevent wastage and in this connection I have provided U-shaped boxings or caps 55 pivotally mounted upon the ends by means of pins 56 and adapted to be swung upwardly so that the base wall 57 and the front wall 58 close off these open ends.

The entire assembly is made readily detachable as clearly illustrated in the drawings in order to enable the various components to be cleaned and sterilized readily and finally reference should be made to a rear shield 59 protecting the rear of the yolk collecting trough 45 and a substantially V-shaped trough 60, beneath the egg separating component 24 which is adapted to collect any spillage which may occur during the cracking and dumping of the contents.

From the foregoing, it will be appreciated that it is desirable to crack and dump four eggs into the components 24 whereupon they are viewed for freshness and the like, and if found to be fresh then they can be decanted as hereinbefore described. However, if one or more of the containers is found to contain a contaminated egg, then the entire egg separating component 24 including the stem 25, and the cups 26 and 27, can be lifted off the support bar 8 and replaced with a clean assembly so that processing can continue.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An egg separator comprising in combination a supporting framework, a support mounted for tilting movement on said supporting framework, means to tilt said support, at least one egg separating component mounted on said support, said egg separating component comprising a yolk containing cup and an albumen containing cup situated below said yolk containing cup, a pair of troughs in said framework adapted to receive yolks on the one hand and albumen on the other hand when said support is tilted, an albumen cut-off plate adapted to be contacted by the perimeter of said yolk containing cup when said support is tilted and to guide yolk from yolk containing cup to one of said troughs and albumen from said albumen containing cup to the other of said troughs, said cut-off plate including an inclined plate, semi-circular cut-outs in the edge of said plate for each of said egg separating components, a forward guide plate extending downwardly from the lower edge of said inclined plate and terminating within said albumen collecting trough and a rearward dividing plate extending downwardly from the lower edge of said cut-off plate and terminating within said yolk containing trough.

2. The device according to claim 1 in which said yolk and albumen egg separating cups consist of a relatively wide lower cup for containing albumen, a stem extending upwardly from the centre of said cup, said yolk containing cup being supported upon the upper end of said stem concentrically with but spaced from this albumen containing cup.

3. The device according to claim 1 which includes pivoted shut-off means on said yolk and albumen collecting troughs, said shut-off means comprising a U-shaped boxing pivotally secured to one end of said troughs and adapted to be swung upwardly thereby closing off said ends.

4. The device according to claim 2 which includes pivoted shut-off means on said yolk and albumen collecting troughs, said shut-off means comprising a U-shaped boxing pivotally secured to one end of said troughs and adapted to be swung upwardly thereby closing off said ends.

References Cited in the file of this patent

UNITED STATES PATENTS

| | | |
|---|---|---|
| 1,479,730 | Moeslein | Jan. 1, 1924 |
| 1,747,432 | Eskholme | Feb. 18, 1930 |
| 1,795,118 | Hall | Mar. 3, 1931 |
| 2,775,277 | Christen | Dec. 25, 1956 |